United States Patent [19]

Nishizawa

[11] Patent Number: 5,457,991
[45] Date of Patent: Oct. 17, 1995

[54] MECHANICAL ACCELERATION SENSOR

[75] Inventor: Muneo Nishizawa, Shiga, Japan

[73] Assignee: Takata Corporation, Tokyo, Japan

[21] Appl. No.: 182,649

[22] Filed: Jan. 18, 1994

[30] Foreign Application Priority Data

Jan. 22, 1993 [JP] Japan .................................. 5-025958

[51] Int. Cl.$^6$ ........................................................ G01P 1/02
[52] U.S. Cl. ............................................ 73/493; 280/806
[58] Field of Search ...................... 73/493, 514, 517 R, 73/539; 340/467, 479; 200/61.45 R, 61.53; 280/806

[56] References Cited

U.S. PATENT DOCUMENTS

| 2,332,994 | 10/1943 | Draper | 73/516 R |
| 3,593,277 | 7/1971 | Faude | 340/467 |
| 4,864,086 | 9/1989 | Akiyama et al. | 200/61.53 |

FOREIGN PATENT DOCUMENTS 2216391  10/1989  United Kingdom .

*Primary Examiner*—Hezron E. Williams
*Assistant Examiner*—Christine K. Oda
*Attorney, Agent, or Firm*—Brumbaugh, Graves, Donohue & Raymond

[57] ABSTRACT

A mechanical acceleration sensor includes a weight, a latch lever, and a spring-loaded firing pin, which are movably supported in a casing. The latch lever is disengaged from the firing pin by inertial movement of the weight relative to the casing, thereby allowing the firing pin to perform a percussive firing action by the spring load. The weight is supported in the casing by a pair of first and second guide members for guiding the inertial movement of the weight. The first guide member is closely fitted in the weight, while the second guide member is loosely fitted in the weight. An error in parallelism between the first and second guide members is accommodated by the loose fitting of the second guide member. When sensing excessive acceleration, the weight effectively moves without interference with other members while only slightly rotating about the axis of the first guide member to absorb the error in parallelism.

2 Claims, 5 Drawing Sheets

MECHANICAL ACCELERATION SENSOR

BACKGROUND OF THE INVENTION

The present invention relates to a mechanical acceleration sensor for activating a gas generator of an inflator in an air bag system or a pretensioner in a seat belt system.

Vehicles, for example, automobiles, are often provided with an air bag system or a seat belt system. For an inflator in the air bag system or a pretensioner in the seat belt system, a gas generator is employed as a device for generating a driving medium for the inflator or the pretensioner. Such a gas generator is activated by an acceleration sensor. Acceleration sensors used for this purpose include two types, namely, a sensor that outputs an electric signal and a mechanical sensor that outputs a mechanical displacement of a member. Electrical sensors are generally superior insofar as the acceleration pulse discriminating ability is concerned, and hence advantageous in that an erroneous operation is unlikely to occur. On the other hand, electrical sensors require a power supply and electrical connections. Therefore, the installation location is somewhat limited. In contrast, mechanical acceleration sensors may be inferior to electrical sensors in acceleration pulse discriminating capability, but they are less costly and need no electric supply or electrical connections. Therefore, mechanical acceleration sensors are advantageous in that they can be used without limitation on the installation location. Under these circumstances, various mechanical acceleration sensors have been proposed and are known.

There is one form of such mechanical sensor in which when a predetermined level of acceleration acts on the vehicle, a firing pin of the sensor is percussively actuated to activate the inflator of the air bag system. This type of mechanical sensor has a weight, a latch lever, and a firing pin, which are movably supported in a sensor casing. The firing pin, which is spring-loaded, is released from the restraint by the latch lever by the inertial movement of the weight relative to the casing, thereby allowing the firing pin to perform a percussive firing action (for example, see Japanese Utility Model Application Laid-Open (KOKAI) No. 2-32464 (1990), the subject matter of which is to make the position of the weight relative to the latch lever adjustable in the above-described arrangement).

In the above-described conventional mechanical sensor, the weight is movably supported in the casing relatively loosely, and hence the behavior of the weight is likely to change, depending upon the position in which the sensor is oriented in a given installation. Accordingly, inaccurate operation due to a particular orientation is always a possibility. In addition, since the space for the operation of the latch lever and the space for the movement of the weight must be provided separately from each other to avoid interference between these two components, the overall size and weight of the sensor become large in comparison to the weight of the weight member.

Such a problem might be solved by allowing the weight to be closely supported in the casing and preventing rotation and rolling of the weight except for movement thereof in the direction of inertia, thereby avoiding interference between the operation of the latch lever and the inertial movement of the weight, and thus enabling weight and lever to share the same space for their respective operations. However, a guide device used for the weight must be formed with high accuracy in order to employ the above-described concept while ensuring the high reliability required for the proper functioning of the weight. To meet the requirements, it is required not only to increase the machining accuracy of each individual constituent element of the sensor, including the casing, the weight, etc., but also to ensure a high assembling accuracy.

SUMMARY OF THE INVENTION

The present invention has been made in view of the above-described circumstances, and it is an object of the present invention to provide a mechanical acceleration sensor which is arranged so that the inertial movement of the weight is made even more reliable by using a guide device capable of preventing undesired rotation and rolling of the weight without requiring a particularly high level of accuracy for machining and assembling the constituent elements of the sensor, thereby eliminating the restrictions on the orientation of the sensor in relation to a pretensioner or air bag inflator as much as possible, and so that the overall size and weight of the sensor are reduced in comparison to the size and weight of the weight.

To attain the above-described object, the present invention provides a mechanical acceleration sensor having a weight movably supported in a casing, a latch lever movably supported in the casing to face the weight and loaded with a set load, and a firing pin movably supported in the casing and spring-loaded to engage the latch lever, so that the latch lever is disengaged from the firing pin against the set load by inertial movement of the weight relative to the casing, thereby allowing the firing pin to perform a percussive firing action. The weight is supported in the casing by a pair of first and second guide members for guiding the inertial movement of the weight. The first guide member is closely fitted in the weight to closely define a direction of inertial movement of the weight. The second guide member is loosely fitted in the weight to cooperate with the first guide member to limit rotation of the weight about the axis of the inertial movement thereof.

In a preferred arrangement, the second guide member is a bar fitted in a groove in the weight that extends in the direction of inertial movement of the weight, the groove being configured such that the fitting clearance between the groove and the bar is gradually enlarged along the direction of inertial movement of the weight.

In the mechanical sensor of the present invention, when sensing excessive acceleration, the weight moves by inertia in a direction specified by the first guide member to release the firing pin from the restraint by the latch lever, thereby allowing the firing pin to perform a percussive firing action. An error in parallelism between the first and second guide members, which is a factor in preventing the weight from smoothly moving in the direction specified by the first guide member, is absorbed by the loose fitting groove in the weight to the second guide member. Accordingly, the weight smoothly moves without interference with other members while only slightly rotating about the axis of the first guide member to absorb the error in parallelism.

Thus, according to the mechanical acceleration sensor of the present invention, smooth inertial movement of the weight is ensured and it is possible to limit rotation of the weight during the inertial movement without the need of particularly increasing the degree of parallelism between the pair of guide members. Accordingly, it is possible to provide an arrangement in which the weight is disposed in close proximity to or in complicated relation to other constituent elements and to reduce the overall size and weight of the sensor by rationally arranging the constituent elements. In addition, since it is possible to avoid interference between the weight and other constituent elements during the movement of the weight, the orientation of the of the system, including an apparatus to which the sensor is attached, can be selected as desired according to the particular installation.

DESCRIPTION OF THE EMBODIMENTS

Figure 1:
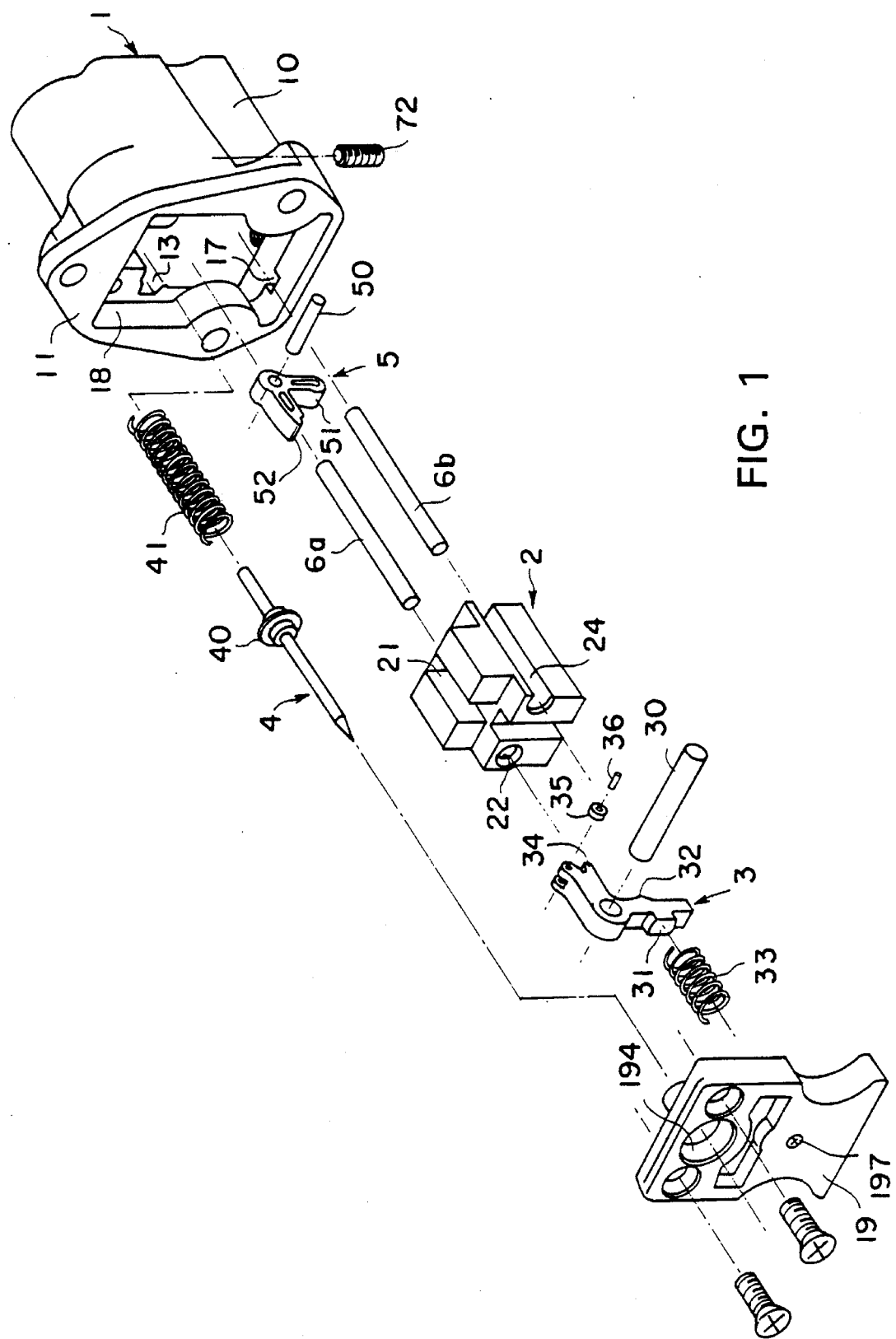
FIG. 1 is an exploded perspective view of one embodiment of the mechanical acceleration sensor according to the present invention.

One embodiment of the present invention, which is a mechanical acceleration sensor suitable for percussively activating a power source of a pretensioner, will be described below with reference to the accompanying drawings. As shown in the exploded perspective view of FIG. 1, the mechanical acceleration sensor (referred to simply as "sensor" in the following description of the embodiment) has a weight 2 movably supported in a casing 1, a latch lever 3 loaded with a set load and disposed to face the weight 2, and a firing pin 4 spring-loaded to engage the latch lever 3 through a roller 35. In the embodiment, a sub-lever 5 is provided in conjunction with the latch lever 3. The sub-lever 5 is disposed to face a side of the weight 2 which is opposite to the side that faces the latch lever 3. Accordingly, the sub-lever 5 cooperates with the latch lever 3 to clamp the weight 2 from both sides of the direction of inertial movement of the weight 2. The weight 2 is movably supported in the casing 1 through a pair of first and second guide members (a pair of slide bars 6a and 6b in the embodiment) that prevent rotation of the weight 2 about the axis of inertial movement thereof. The slide bar 6a is closely fitted in a slide bar receiving hole 22 provided in the weight 2, whereas the slide bar 6b is loosely fitted in a slide bar fitting groove 24 provided in the weight 2. The manner in which the slide bar 6b is loosely fitted in the slide bar fitting groove 24 will be explained later in detail.

The details of the arrangement of the sensor will be explained below more specifically (although the positional relationship will be explained below on the assumption that the direction of the percussive firing action of the firing pin 4 is the forward direction for the sake of convenience, it should be noted that the set-up orientation of the sensor is not limited thereto). The sensor includes a casing 1 which has a body 10 and a lid 19. The lid 19 closes the front open end of the body 10 and also functions as a holder. The sensor further includes a weight 2, a latch lever 3, a firing pin 4, a sub-lever 5, a pair of slide bars 6a and 6b, a support pin 30, a set spring 33, a roller 35, a pin 36, a firing spring 41, and a support pin 50, which are incorporated in the casing 1. Reference numeral 72 designates an additional adjustment screw.

Figure 5:
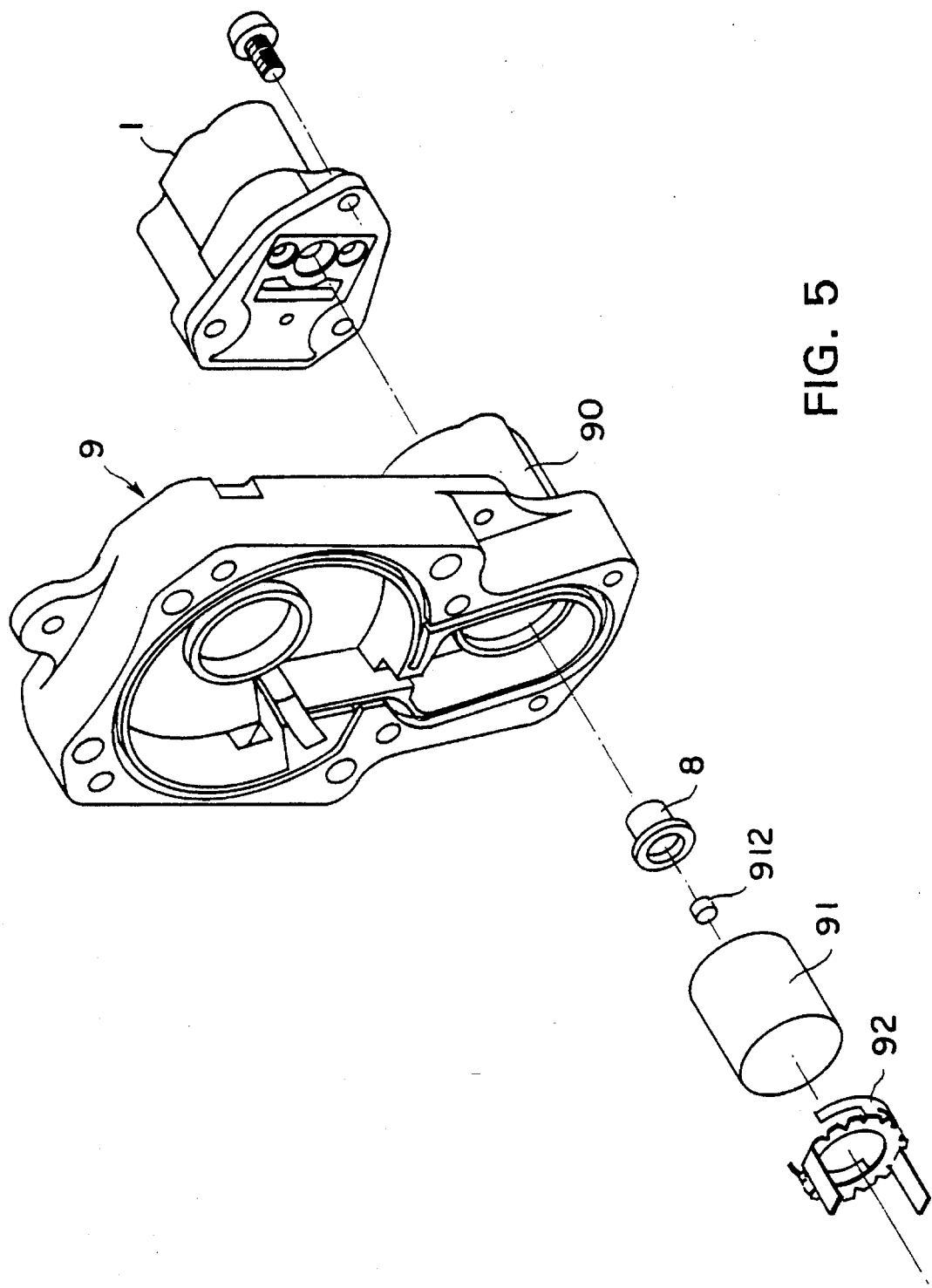
FIG. 5 is an exploded perspective view showing the way in which the embodiment is assembled into a pretensioner.

As will be understood from reference to FIG. 3 in combination with FIG. 1, the body 10 is in the form of a cylinder, the forward end of which is open, and an outwardly extending plate-shaped flange 11 is provided on the forward end of the body 10 and serves as a mounting flange for connection to a housing 90 (see FIG. 5). The flange 11 is formed with three screw receiving holes for attaching the casing 1 to the housing 90. The flange 11 is further formed with a lid-fitting recess 18 having a shape complementary to the external shape of the lid 19 at a position surrounded by the three screw receiving holes. In addition, the boundary between the recess 18 and the bottom wall of the body 10 is formed with a pair of engagement holes 17 corresponding to engagement pieces 195 formed on the lid 19. The rear end wall of the body 10 has a pair of support holes 16 for supporting the respective rear ends of the slide bars 6a and 6b. The rear end wall of the body 10 is further formed with a forwardly extending tubular flange 14 that supports the rear end of the firing pin 4 at the inner periphery thereof and that guides the rear end of the firing spring 41 at the outer periphery thereof, and a pair of forwardly extending support blocks 15 having support grooves 150 for supporting two ends, respectively, of the support pin 50 for the sub-lever 5. Two mutually opposing side walls of the body 10 are, respectively, formed with support grooves (one of them is shown by reference numeral 13), the forward ends of which are open to support the opposite ends of the support pin 30 for the latch lever 3. The bottom wall of the body 10 is formed with a pair of longitudinally spaced adjustment screw holes 101 and 102.

The lid 19 is formed with a stepped hole 194 extending through the wall thereof to constitute a hole for receiving the firing pin 4. The stepped hole 194 has an enlarged-diameter portion at its forward end, that is, the end that faces the housing 90. The lid 19 is further formed with a pair of left and right slide bar support holes 196, a set screw hole 197, a spring seat hole 193 which is contiguous with the set screw hole, and a pair of screw receiving holes for fastening the lid 19 to the body 10. In addition, the lid 19 is provided with a pair of rearwardly extending retaining projections 191 which are fitted to the support grooves 13, respectively.

The weight 2 has a prismatic configuration and has in its center a groove 21 that extends along the front, across the top and partway down the back and serves as a space for accommodating the latch lever 3 and the sub-lever 5. Step portions are provided at the forward and rear ends of the upper part of the weight 2 in order to avoid interference with the support pins 30 and 50 for the latch lever 3 and the sub-lever 5. The weight 2 is formed with a slide bar receiving hole 22 and a slide bar fitting groove 24, which extend longitudinally through the weight 2. The lower side of the weight 2 is formed with a groove 23 of trapezoidal cross-section which has sloping front and rear walls.

Figure 2A:
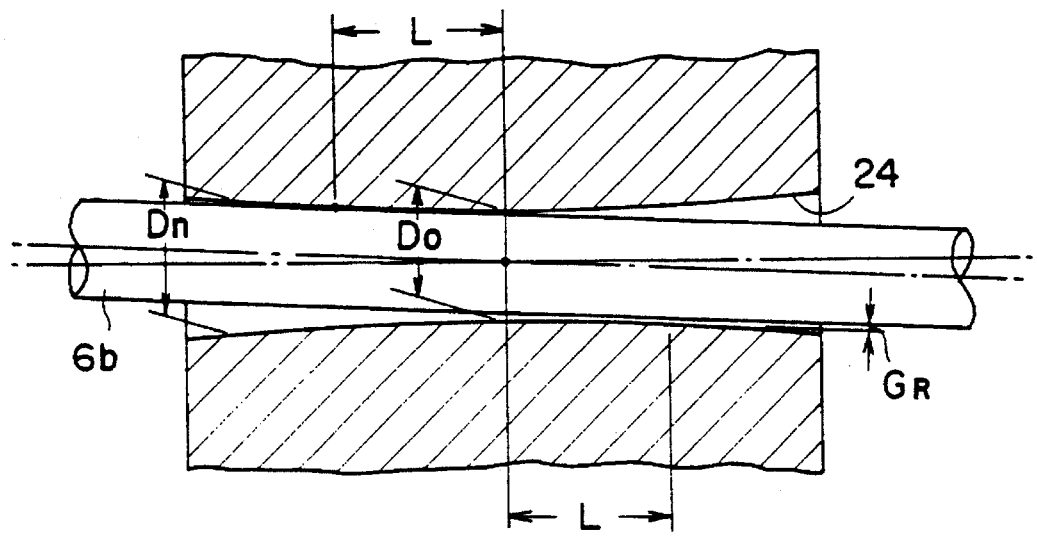
FIGS. 2A and 2B are exaggerated schematic views of a weight guide structure in the embodiment.

In the embodiment, the slide bar 6a is a circular cylindrical shaft, the outer diameter of which has a predetermined fit tolerance with respect to the slide bar receiving hole 22 in the weight 2 so that the slide bar 6a is closely fitted in the hole 22, which has a circular cross-section, as shown in FIG. 2. The slide bar 6b is also a circular cylindrical shaft similar to the slide bar 6a. However, the slide bar 6b is loosely fitted in the slide bar fitting groove 24 in the weight 2. More specifically, in the embodiment the fitting clearance between the slide bar fitting groove 24 and the slide bar 6b is gradually enlarged along the direction of inertial movement of the weight 2 by gradually enlarging the diameter of the slide bar fitting groove 24; in particular, the slide bar fitting groove 24, which is formed in one side surface of the weight 2, has a semi-cylindrical bottom which varies in diameter D along its length such that the longitudinally central portion of the groove 24 has the smallest diameter $D_o$ and the diameter D is enlarged toward each end of the groove 24 ($D_n > D_o$). The reason why the slide bar fitting groove 24 is enlarged in diameter toward each of the longitudinal ends in the embodiment is to make the arrangement conformable to the design of the sensor which enables the direction of inertial movement of the weight 2 to be set in both forward and backward directions (S and −S directions shown in FIG. 2).

Referring back to FIGS. 1 and 3, the latch lever 3 is formed in an L-shape having a pair of arms, and the bent portion of the latch lever 3 has a hole that receives a support pin 30 so that the latch lever 3 is rotatable about the pin 30. The portion of one arm that faces the spring seat hole 193 is formed with a projection 31 for positioning the arm-side end portion of a set spring 33. The rear side of this portion of the arm is formed with a projection 32 which faces the front side of the weight 2. The distal end of the other arm is formed with an involute tooth 34. A roller 35, which functions as a bearing, is supported through a pin 36 in a cut portion formed in the center of the upper portion of the distal end of the arm.

The sub-lever 5 is similarly formed in an L-shape having a pair of arms, and the bent portion of the sub-lever 5 receives the support pin 50 so that the sub-lever 5 is rotatable about the pin 50. The front side of one arm is formed with a projection 51 which faces the rear side of the weight 2. The distal end of the other arm is formed with an involute tooth 52 which is meshed with the involute tooth 34 formed at the distal end of one arm of the latch lever 3.

The firing pin 4 is sharpened at its forward end in order to concentrate points of impact against a percussion cap 912 (see FIG. 5). The center of the firing pin 4 has a collar 40 which serves as a portion for engagement with the latch lever 3 and also serves as a spring seat. The front side of the collar 40 is reduced in diameter to define a step for engagement with the outer peripheral surface of the roller 35. The rear side of the collar 40 is reduced in diameter to constitute a spring seat for a firing spring 41.

Figure 3A:
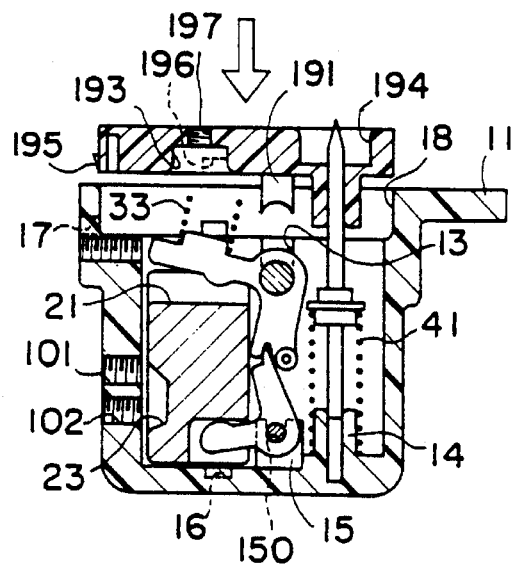
FIGS. 3A and 3B are side cross-sectional views schematically showing assembling and setting procedures for the embodiment.

As shown in FIG. 3A, the various components are incorporated into the body 10, for example, in the following procedure. First, the support pin 50 is inserted into the sub-lever 5, and both ends of the pin 50 are fitted into the respective grooves 150 formed in the rear wall of the body 10, thereby supporting the sub-lever 5 in the innermost part of the body 10. Next, the weight 2, which has the slide bars 6a and 6b respectively inserted into the slide bar receiving hole 22 and the slide bar fitting groove 24, is fitted into the body 10. At this time, since the external shape of the weight 2 and the internal shape of the body 10 are complementary to each other, the distal ends of the guide bars 6a and 6b are readily fitted into the pair of support holes 16, respectively, which are formed in the rear wall of the body 10. Thus, the weight 2 is positioned at one end thereof. Next, the support pin 30 is inserted into the latch lever 3, and both ends of the pin 30 are fitted into the pair of support grooves 13, respectively, which are formed in the mutually opposing side walls of the body 10, thereby incorporating the latch lever 3 into the body 10. At this time, the two involute teeth 34 and 52 are meshed with each other, as a matter of course.

Meantime, at any time during the above-described assembling procedure, the firing spring 41 is inserted into the body 10, and one end thereof is fitted into the spring seat 14. Next, the firing pin 4 is inserted into the firing spring 41 so that the collar 40, which is integral with the firing pin 4, is fitted into the other end of the firing spring 41. Thus, the incorporation of all the members is completed. Then, the lid 19 is pushed into the opening 18 of the body 10 with the members positioned such that the forward end of the firing pin 4 fits into the stepped hole 194 in the lid 19 and the forward end of the set spring 33 fits into the spring seat hole 193. At this time, the forward ends of the pair of slide bars 6a and 6b automatically fit into the respective slide bar support holes 196 in the lid 19, and the pair of engagement pieces 195 are elastically engaged with the respective engagement holes 17. Finally, a pair of set screws are screwed into the lid 19, thereby completing the assembly.

Figure 3B:
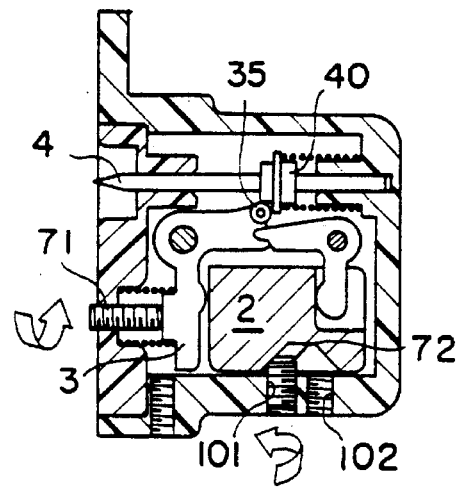

The sensor arranged as described above can be set in any of three different operative conditions according to the acceleration sensing direction selected. When the sensor is to be set in a common operative condition, in which it is adapted to operate in response to only negative acceleration (deceleration), a setting procedure as shown in FIG. 3B is followed. First, the adjustment screw 71 is tightened with a predetermined level of torque by using a torque driver or the like. Consequently, the roller 35 is correctly positioned with respect to the step portion of the collar 40 of the firing pin 4. In this state, the adjustment screw 72, which has been screwed into the adjustment screw hole 101, is tightened by using a torque driver or the like in the same way as described above. Consequently, the sloping portion of the groove 23 of the weight 2 is engaged by the inner end of the adjustment screw 72, causing the weight 2 to be pressed against the latch lever 3. As a result, the clearance therebetween disappears, and the weight 2 is set in position without play. Finally, the adjustment screw 71 is removed, and thus the setting is completed. Thus, all the settings of the sensor can be effected simply by controlling the torque externally applied by a screwing operation without the need for visual observation.

It should be noted that when the sensor is to be set so as to be capable of operating in response to both acceleration and deceleration, the adjustment screw 72 is removed in the above-described set condition. In this set condition, the sensor operates not only when excessive deceleration acts on the sensor at the time of a front-end collision or other similar accident but also when excessive acceleration acts thereon due to a rear-end collision or other similar accident. In the meantime, the acceleration sensing direction can be matched with the set position of the sensor regardless of whether it is set to face forward or backward. In such a case, the acceleration sensing direction can be set by determining which one of the pair of adjustment screw holes 101 and 102 of the casing 1 should be selected to be engaged with the adjustment screw 72.

Further, the sensor can be set up in an orientation which is established by properly rotating it about the axis of movement of the weight 2 or the firing pin 4, as shown in FIG. 5. This capability of the sensor is obtained due to the fact that since the rotation of the weight 2 about the axis of movement thereof is prevented by the pair of guide members 6, the latch lever 3 and the weight 2 will not interfere with each other during the operation despite the complicated arrangement of the latch lever 3 and the weight 2. The elimination of the restriction on the orientation is mainly useful to increase the degree of freedom with which a retractor equipped with the sensor can be installed on a vehicle. It is also possible to set up the sensor with the longitudinal axis thereof vertically inclined at a predetermined angle with respect to that of the sensor installed in the normal orientation. This capability of the sensor is obtained mainly due to the fact that the weight 2 is set in position without play so that no impact load will be applied to the latch lever 3 from the weight 2. The reduction in the limitation on the orientation can be used most effectively when a retractor equipped with the sensor is installed with an inclination in conformity to the inclination of the pillar of the vehicle.

FIG. 5 shows the positional relationship between the sensor, arranged as described above, and a pretensioner 9 to which the sensor is attached. The sensor is attached to the pretensioner 9 by securing the sensor casing 1 to a housing 90 of the pretensioner 9 by using screws, and it is connected to a gas generator 91 which is accommodated in the housing 90 and fastened at the forward end thereof by a snap ring 92. Reference numeral 8 denotes a coupler seal interposed in the joint between the housing 90 and the casing 1 to prevent leakage of a gas, which is generated when the gas generator 91 is activated, to the outside of the joint. Reference numeral 912 denotes a percussion cap embedded at the rear of the gas generator 91.

Figure 2B:
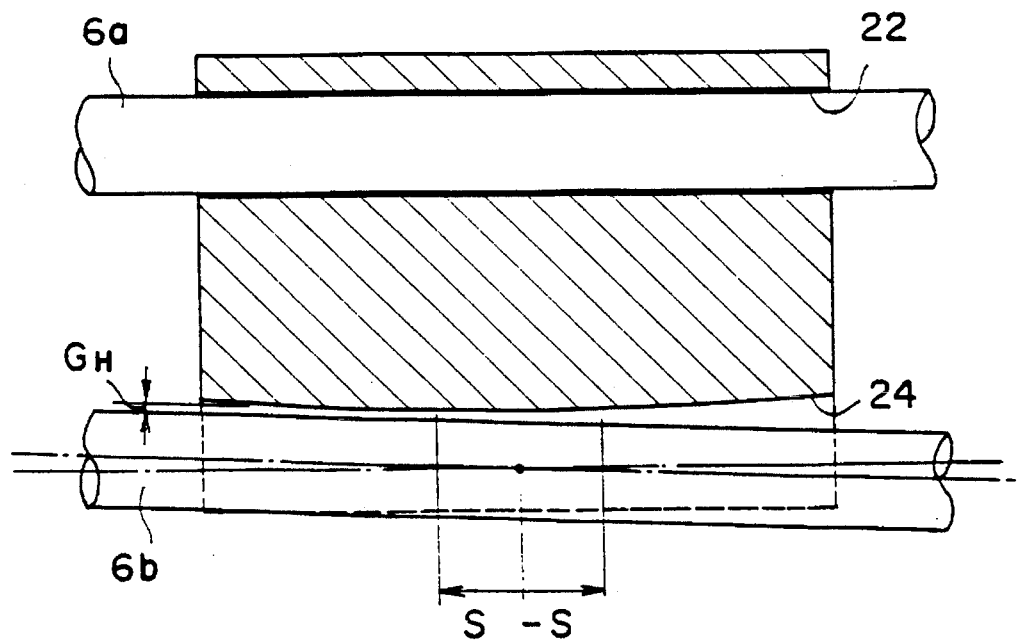
Figures 4A, 4B, 4C:
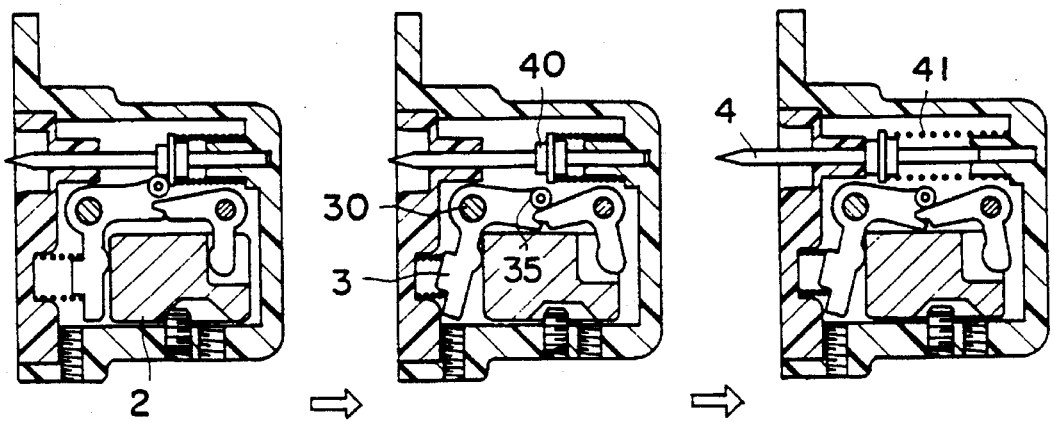
FIGS. 4A, 4B, and 4C are side cross-sectional views schematically showing the operation of the embodiment.

FIG. 4 shows the operation of the sensor. When the sensor is in an inoperative state, the weight 2 is in the position shown in FIG. 4A. When excessive acceleration acts on the sensor, the weight 2 moves as shown in FIG. 2B by inertia. The motion of the weight 2 causes the latch lever 3 to rotate about the support pin 30, disengaging the roller 35 from the collar 40. Consequently, the firing pin 4 is percussively pushed out by the force of the firing spring 41, as shown in FIG. 4C. The percussive firing action of the firing pin 4 causes the percussion cap 912 to be fired, which in turn causes the propellant in the gas generator 91 to be ignited to generate a gas. In this way, the supply of gas to the pretensioner is effected.

The positions of the support holes 16 and 196 for the pair of slide bars 6a and 6b for guiding the weight movement during the above-described operation may not be precisely located. Particularly, when the casing 1 is formed by a molding process using a polymeric material, it is very difficult to form a total of four support holes, that is, the two support holes 16 in the casing 1 and the two support holes 196 in the lid 9, which is screwed to the casing 1, without errors in position. It is advantageous in terms of process and production costs to adopt a method of forming these support holes in anticipation that some errors will unavoidably occur. Therefore, such a processing method is adopted in the present invention. Errors in position of the support holes appear as an error in parallelism between the axes of the two slide bars 6a and 6b.

One may consider the error in parallelism as an error of the slide bar 6b relative to the slide bar 6a. First, regarding inclination in the vertical direction, when the point of contact of the upper surface of the slide bar fitting groove 24 with the upper peripheral surface of the slide bar 6b is offset from the origin by the distance L due to the vertical inclination, as shown in FIG. 2, the lower peripheral surface of the slide bar 6b comes closest to the lower surface of the slide bar fitting groove 24 at a position where the distance from the origin is −L. Accordingly, if a condition of enlargement in the direction of the width of the groove 24 is set so that a minute gap $G_R$ is produced at the position of distance −L, it is unlikely that the weight movement will be obstructed by the parallelism error in the vertical direction. Thus, the weight 2 can move smoothly.

With regard to inclination in the horizontal direction, the gap between the peripheral surface of the slide bar 6b at the inner side thereof and the bottom surface of the slide bar fitting groove 24 reaches a minimum at the extremity of the stroke S (or −S) of the weight 2 due to the inclination. Accordingly, if a condition of enlargement in the direction of depth of the groove 24 is set so that a predetermined minute gap $G_H$ is left even at the above-described position, the weight 2 can smoothly move without being obstructed by the parallelism error in the horizontal direction.

Thus, in a sensor according to the present invention, smooth inertial movement of the weight 2 is ensured and it is possible to limit rotation of the weight 2 within the range of the gap GR during the inertial movement without the need of particularly increasing the degree of parallelism between the pair of guide members. Accordingly, although the latch lever 3 and the sub-lever 5 are disposed in close proximity to and in complicated relation to each other, it is possible to reduce the overall size and weight of the sensor by rationally arranging the constituent elements as described above. In addition, since it is possible to avoid interference between the weight 2 and other constituent elements during the movement of the weight 2, an orientation of the system, including an apparatus to which the sensor is attached, can be selected as desired according to the particular application.

Although the present invention has been explained above by way of one embodiment in which the present invention is applied to an activating device for a pretensioner in a seat belt system, the present invention is not limited to the described embodiment and is also applicable, for example, to an inflator in an air bag system. Further, various changes and modifications may be imparted to the specific arrangement without departing from the scope of the invention, as set forth in the appended claims.

Figure 6:
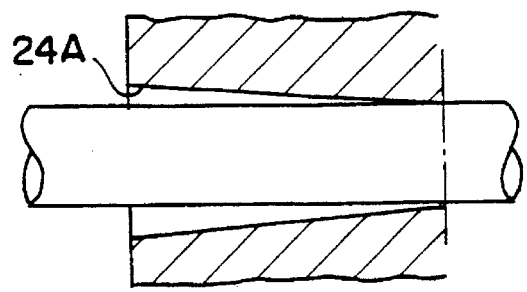
FIG. 6 is an exaggerated schematic view of a first modification of the weight guide structure.
Figure 7:
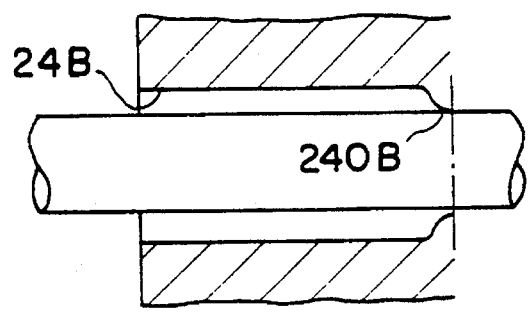
FIG. 7 is an exaggerated schematic view of a second modification of the weight guide structure.
Figure 8:
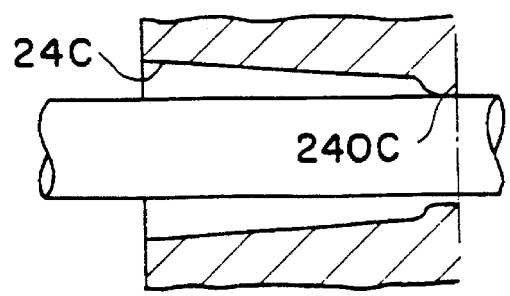
FIG. 8 is an exaggerated schematic view of a third modification of the weight guide structure.

A modification of the loose fitting of the second guide member in the weight will be briefly explained below. Although in the foregoing embodiment the slide bar fitting groove 24 is enlarged arcuately, a groove 24A which is enlarged in a straight-line form as shown in FIG. 6 may be used in place of the groove 24. In this case, the groove bottom is semi-conical. FIG. 7 shows another modification in which a groove 24B has a reduced-diameter portion 240B formed in the center (or at one end) of the semi-cylindrical groove bottom. FIG. 8 shows a groove configuration formed by combining together the above-described two modifications, in which a groove 24C is enlarged in a semi-conical shape with a reduced-diameter portion 240C formed in the center (or at one end) of the semi-cylindrical groove bottom.

I claim:

1. In a mechanical acceleration sensor having a weight movably supported in a casing, a latch lever movably supported in the casing to face the weight and loaded with a set load, and a firing pin movably supported in the casing and spring-loaded to engage the latch lever, so that the latch lever is disengaged from the firing pin against the set load by inertial movement of the weight relative to the casing, thereby allowing the firing pin to perform a percussive firing action, the improvements comprising a pair of first and second guide means supported by the housing for supporting the weight in the casing and for guiding the inertial movement of the weight, the first guide means being closely fitted in the weight to define a direction of inertial movement of the weight, and the second guide means being substantially coextensive with and parallel to the first guide means in the direction of inertial movement of the weight and being loosely fitted in the weight to cooperate with the first guide means to limit rotation of the weight about an axis of inertial movement thereof.

2. A mechanical acceleration sensor according to claim 1, wherein the second guide means is a bar fitted in a groove which is formed in the weight to extend in the direction of inertial movement of the weight such that a fitting clearance between the groove and the bar is gradually enlarged along the direction of inertial movement of the weight.

\* \* \* \* \*